H. Kendall,
Cheese Press,
Nº 3,178,  Patented July 15, 1843.
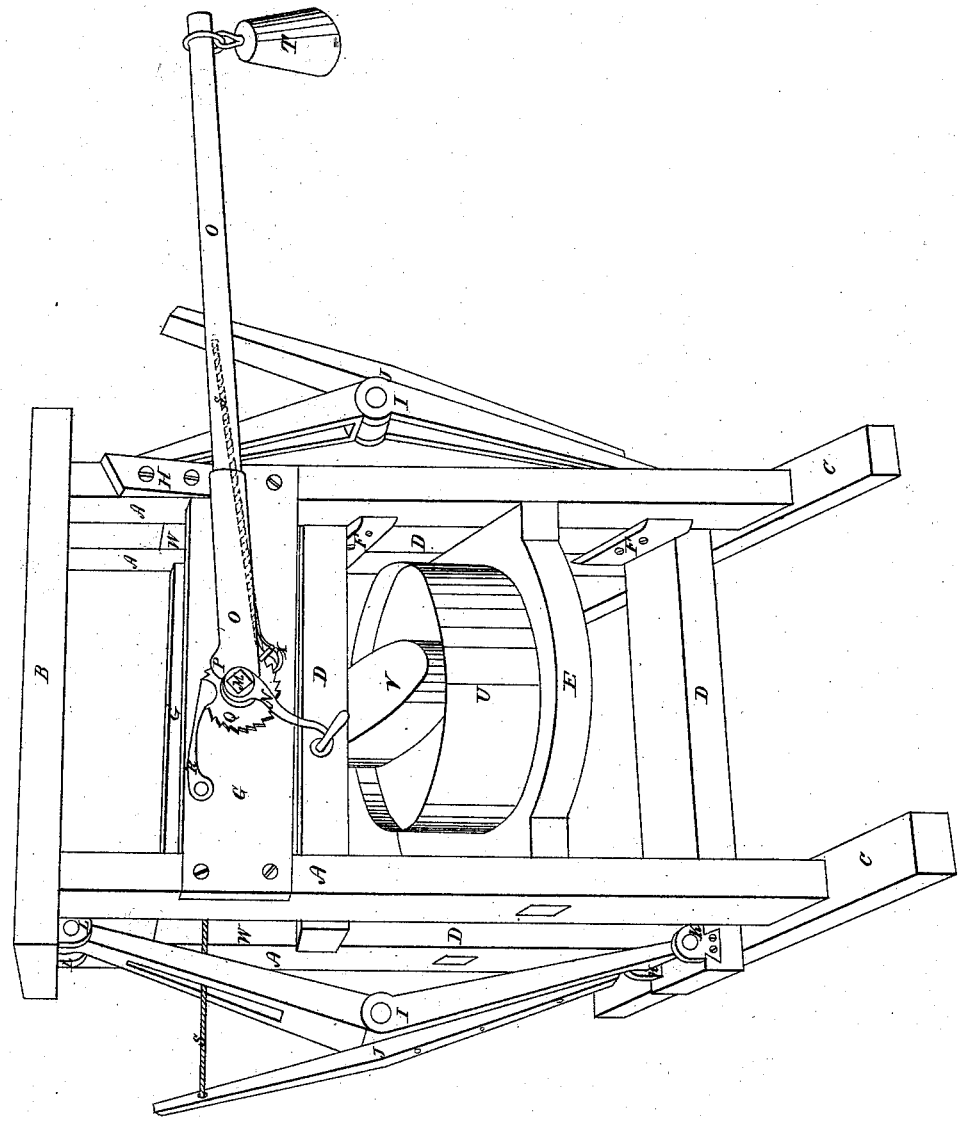

UNITED STATES PATENT OFFICE.

HARTWELL KENDALL, OF DANBY, VERMONT.

CONSTRUCTION OF CHEESE-PRESSES.

Specification of Letters Patent No. 3,178, dated July 15, 1843.

*To all whom it may concern:*

Be it known that I, HARTWELL KENDALL, of Danby, in the county of Rutland and State of Vermont, have invented a new and Improved Mode of Pressing Cheese by a Machine Called H. Kendall's Cheese-Press; and I do hereby declare that the following is a full and exact description.

The nature of my invention consists in the multiplied force of lever power adapted to gradual and increased pressure. The scale on which it is adjusted is to press sixty five pounds for each one half pound of power, which may be applied to the lever O as at T.

To enable others skilled in the art to make and use my invention, I will proceed to describe its construction and operation.

I construct my frame in any of the forms and as shown in the accompanying drawing. The bed plates C, C, are about eighteen inches long, the posts A, A, A, A, being about five feet long and are secured to the bed plates by tenons and mortises. Upon the top of these posts I place the cap plate B, which is about two and one half feet long. The platform E is affixed to the posts by mortises and tenons about eighteen inches above the sills C C, as shown at E, and forms the table upon which the cheese or articles are to be pressed The frame D, D, D, D, is about two and one half feet in height and is fitted to slide up or down between the posts so as to bring its beam or cap plate to bear upon the articles to be pressed and is constructed in the usual manner. I place a cross piece or bearing G, G, about nine inches wide horizontally each side of the frame. These bearings are parallel and are about nine inches below the cap plate B, and are confined to the ports by screws as shown by a side view of the machine. A round shaft or arbor M extends horizontally through the bearings G, G, having the crank N upon its front end. I place a vertical ratchet wheel Q upon the front end of the arbor M, upon a square gudgeon and in contact with the front bearing G. The wheel is about five inches in diameter. The dog R is attached to the front bearing G by a screw as shown in the drawing and is made to bear upon the ratchet wheel Q as a stop. The lever O is about three feet long, the metallic end of which is placed upon the arbor M between the ratchet wheel Q and the crank N upon a round gudgeon so that its long arm may be raised or depressed without turning the arbor; the short arm of this lever is metallic and is so constructed that its long arm may be attached to it. The spring dog X is about nine inches long and is placed under the lever one end of which is curved so that it will bear upon the ratchet wheel Q as shown at K. The other end of this dog is made to be elastic and is confined to the lever O by rivets which being under the lever are not seen in the drawing. This dog constitutes the fulcrum. I place a small metallic pin within the curve of the dog X and attach the same to the bearing G, horizontally as shown at X. I construct this curve and place the pin at X so as to relieve the ratchet wheel from the dog by elevating the lever O and by depressing the lever the dog will take again to the teeth of the wheel. I also form a cam P, on the lever O as shown at P so as to bring the cam in contact with the dog R, and to relieve the ratchet wheel from this dog (by raising the lever) I construct the metallic elbow levers I, I, about four feet long and place one on each side of the frame as represented at J, J; the ends of these levers have two pivots horizontally attached to them. These pivots bear upon ears forming loose joints. The lower end of these levers are attached to the base or sill of the sliding frame D, D, D, D, by screws as shown at K, K, and the upper ends of the same are attached to the posts A, A, A, A, at the cap plate B, as shown at L, L. In the middle of these levers and at the elbows of the same I form socket joints as shown at I, I. The levers J, J, are each about two and one half feet long and are confined to the lower arms of the levers I, I, as shown at J, J, and extend upward as high as the arbor M. The cord S, S, is attached to the upper ends of the levers J, J, and passes through the grooves in the upper arms of the levers I, I, and between the posts and from them through the center of the arbor M. When the lever O is raised and the crank turned back to the natural position of the machine I place the cheese and apparatus upon the platform E; the crank N is then turned forward by means of which the cord S, S, coils upon the arbor M and draws the elbows I, I, toward each other and the pressure is then commenced. The lever O is then depressed with its weight T. The dog R will take to the ratchet wheel and retain the power obtained. In process of pressing the lever O may be raised at any time so far as not to move the dog R from the ratchet wheel and depressed again as before and in this manner the power of pressure may be retained by the dog R and gradually increased by the elbows on the levers I, I, approximately.

What I claim by my invention and desire to secure by Letters Patent, is—

The combination of the ratchet wheel Q, lever O and crank N, with the windlass or arbor of a lever press constructed and arranged substantially in the manner and for the purpose herein set forth.

HARTWELL KENDALL.

Witnesses:
  GEO. O. VAIL,
  A. R. VAIL.